United States Patent
Chandrasekhar et al.

(10) Patent No.: US 9,060,289 B2
(45) Date of Patent: Jun. 16, 2015

(54) INTERFERENCE MANAGEMENT AND NETWORK PERFORMANCE OPTIMIZATION IN SMALL CELLS

(71) Applicant: wildfire.exchange, inc., San Francisco, CA (US)

(72) Inventors: Vikram Chandrasekhar, Mountain View, CA (US); Andrea Goldsmith, Menlo Park, CA (US); Santhosh Krishna, Sunnyvale, CA (US); Ritesh K. Madan, Jersey City, NJ (US)

(73) Assignee: wildfire.exchange, inc., San Francisco, CA (US)

( * ) Notice: Subject to any disclaimer, the term of this patent is extended or adjusted under 35 U.S.C. 154(b) by 159 days.

(21) Appl. No.: 13/867,993

(22) Filed: Apr. 22, 2013

(65) Prior Publication Data

US 2013/0281089 A1    Oct. 24, 2013

Related U.S. Application Data

(60) Provisional application No. 61/637,174, filed on Apr. 23, 2012.

(51) Int. Cl.
*H04W 24/02* (2009.01)
*H04W 52/14* (2009.01)
(Continued)

(52) U.S. Cl.
CPC ............ *H04W 24/02* (2013.01); *H04W 52/143* (2013.01); *H04W 24/08* (2013.01); *H04W 84/045* (2013.01)

(58) Field of Classification Search
CPC . H04W 16/04; H04W 52/143; H04W 52/265; H04W 52/244; H04W 24/02
USPC ............... 455/418–420, 434, 450–453, 522; 370/328–338
See application file for complete search history.

(56) References Cited

U.S. PATENT DOCUMENTS

| | | | |
|---|---|---|---|
| 7,315,533 B2 | 1/2008 | Theobold et al. | |
| 7,414,978 B2 | 8/2008 | Lun et al. | |

(Continued)

FOREIGN PATENT DOCUMENTS

| | | |
|---|---|---|
| WO | 2012016187 | 2/2012 |
| WO | 2013043869 | 3/2013 |

OTHER PUBLICATIONS

Akhshabi et al., "An Experimental Evaluation of Rate-Adaptation Algorithms in Adaptive Streaming over HTTP", MMSys' 11, Feb. 23-25, 2011, San Jose, CA.

(Continued)

*Primary Examiner* — Kashif Siddiqui
(74) *Attorney, Agent, or Firm* — Van Pelt, Yi & James LLP

(57) ABSTRACT

A method of configuring small cell base stations in a cellular network is disclosed. A constraint on a performance-related metric associated with at least a portion of the cellular network is received. In some embodiments, the constraint on the performance-related metric comprises a constraint on a performance-related metric associated with one or more macrocells. Measurement data from one or more small cell base stations is received via a control interface. One or more optimized values of one or more parameters associated with one or more small cell base stations are searched. The searching is based at least in part on the received measurement data and subject to the constraint on the performance-related metric associated with the at least a portion of the cellular network. The one or more optimized values of the one or more parameters to the associated small cell base stations are transmitted.

34 Claims, 5 Drawing Sheets

(51) Int. Cl.
*H04W 24/08* (2009.01)
*H04W 84/04* (2009.01)

(56) References Cited

U.S. PATENT DOCUMENTS

| | | |
|---|---|---|
| 7,953,403 B2 | 5/2011 | Nientiedt |
| 8,681,810 B2 | 3/2014 | Nandagopalan et al. |
| 8,750,894 B1 | 6/2014 | Stogaitis et al. |
| 8,798,021 B2 | 8/2014 | Mangalvedhe et al. |
| 2006/0258395 A1 | 11/2006 | Cave et al. |
| 2007/0149172 A1 | 6/2007 | Dickinson et al. |
| 2007/0242621 A1 | 10/2007 | Nandagopalan et al. |
| 2008/0090575 A1 | 4/2008 | Barak et al. |
| 2009/0257380 A1 | 10/2009 | Meier |
| 2009/0279427 A1 | 11/2009 | Ji et al. |
| 2009/0316585 A1 | 12/2009 | Srinivasan et al. |
| 2009/0323632 A1 | 12/2009 | Nix |
| 2010/0029282 A1 | 2/2010 | Stamoulis et al. |
| 2010/0167777 A1 | 7/2010 | Raghothaman et al. |
| 2011/0039554 A1 | 2/2011 | Bims |
| 2011/0151886 A1* | 6/2011 | Grayson et al. ............ 455/452.1 |
| 2012/0002567 A1 | 1/2012 | Sun et al. |
| 2012/0009909 A1 | 1/2012 | Lau |
| 2012/0087268 A1 | 4/2012 | Savoor et al. |
| 2012/0088482 A1 | 4/2012 | Pazhyannur et al. |
| 2012/0122503 A1 | 5/2012 | Ma et al. |
| 2012/0257585 A1 | 10/2012 | Sydor et al. |

OTHER PUBLICATIONS

Chambelin et al., "Evaluation of neighbors impact on channel allocation for dense environment and Video use cases", Jan. 17, 2011.
"Cisco Visual Networking Index:Global Mobile Data Traffic Forecast Update, 2012-2017", Cisco White Paper, Feb. 6, 2013.
Donald C. Cox, "Wireless Network Access for Personal Communications", IEEE Communication Magazine, Dec. 1992, pp. 96-115.
Neil Hughes, "iPhone 4 keynote plagued by high-tech Wi-Fi meltdown", Jun. 7, 2010, http://www.appleinsider.com/articles/10/06/07/iphone_4_keynote_plagued_by_hightech_wi_fi_meltdown/.
Jamieson et al., "Understanding the Real-World Performance of Carrier Sense", SIGCOMM'05 Workshops, Aug. 22-26, 2005, Philadelphia, PA.
Kaynia et al., "Improving the Performance of Wireless Ad Hoc Networks Through MAC Layer Design", IEEE Transcations on Wireless Communications, vol. 10, No. 1, Jan. 2011.
Zheng et al., "Diversity and Multiplexing: A Fundamental Tradeoff in Multiple Antenna Channels", IEEE Transactions on Information Theory, vol. 1, No. 8, Aug. 2002.

* cited by examiner

400

402
Receive a Constraint on a Performance-related Metric Associated with Macrocell(s)

404
Receive Measurement Data from Small Cell Base Station(s)

406
Search for Optimized Values of Parameters Associated with Small Cell Base Station(s)

408
Transmit the Optimized Values of the Parameters to the Small Cell Base Station(s)

FIG. 4

INTERFERENCE MANAGEMENT AND NETWORK PERFORMANCE OPTIMIZATION IN SMALL CELLS

CROSS REFERENCE TO OTHER APPLICATIONS

This application claims priority to U.S. Provisional Patent Application No. 61/637,174 entitled INTERFERENCE MANAGEMENT IN LTE HETNETS VIA SON-ENABLED SMALL CELLS filed Apr. 23, 2012 which is incorporated herein by reference for all purposes.

BACKGROUND OF THE INVENTION

Internet Protocol based cellular networks are increasingly migrating from flat to hierarchical architectures in order to address capacity and coverage issues. A hierarchical cellular network includes macrocells and small cells. However, the deployment challenges of small cells have precluded their widespread adoption to date.

BRIEF DESCRIPTION OF THE DRAWINGS

Various embodiments of the invention are disclosed in the following detailed description and the accompanying drawings.

FIG. 4 is a flow chart illustrating an embodiment of a process 400 for automatically and dynamically configuring and updating parameters of the small cell base stations 204 in a cellular network to optimize the overall network performance of the cellular network.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet Protocol based (IP-based) cellular networks, including cellular networks based on the fourth-generation (4G) Long Term Evolution (LTE) standard, face significant capacity and coverage challenges due to the rapidly growing demand for mobile broadband and the limited spectrum available to support such a demand. IP-based cellular networks are increasingly migrating from flat to hierarchical architectures in order to address capacity and coverage issues.

Most second-generation (2G) and third-generation (3G) cellular networks have relatively flat architectures, including mostly macrocells with higher power (e.g., 10 to 40 Watts of transmit power) cellular base stations. While such large cells offer the benefits of fast deployment and wide area coverage, they do not provide high capacity due to their non-aggressive frequency reuse.

Figure 1:
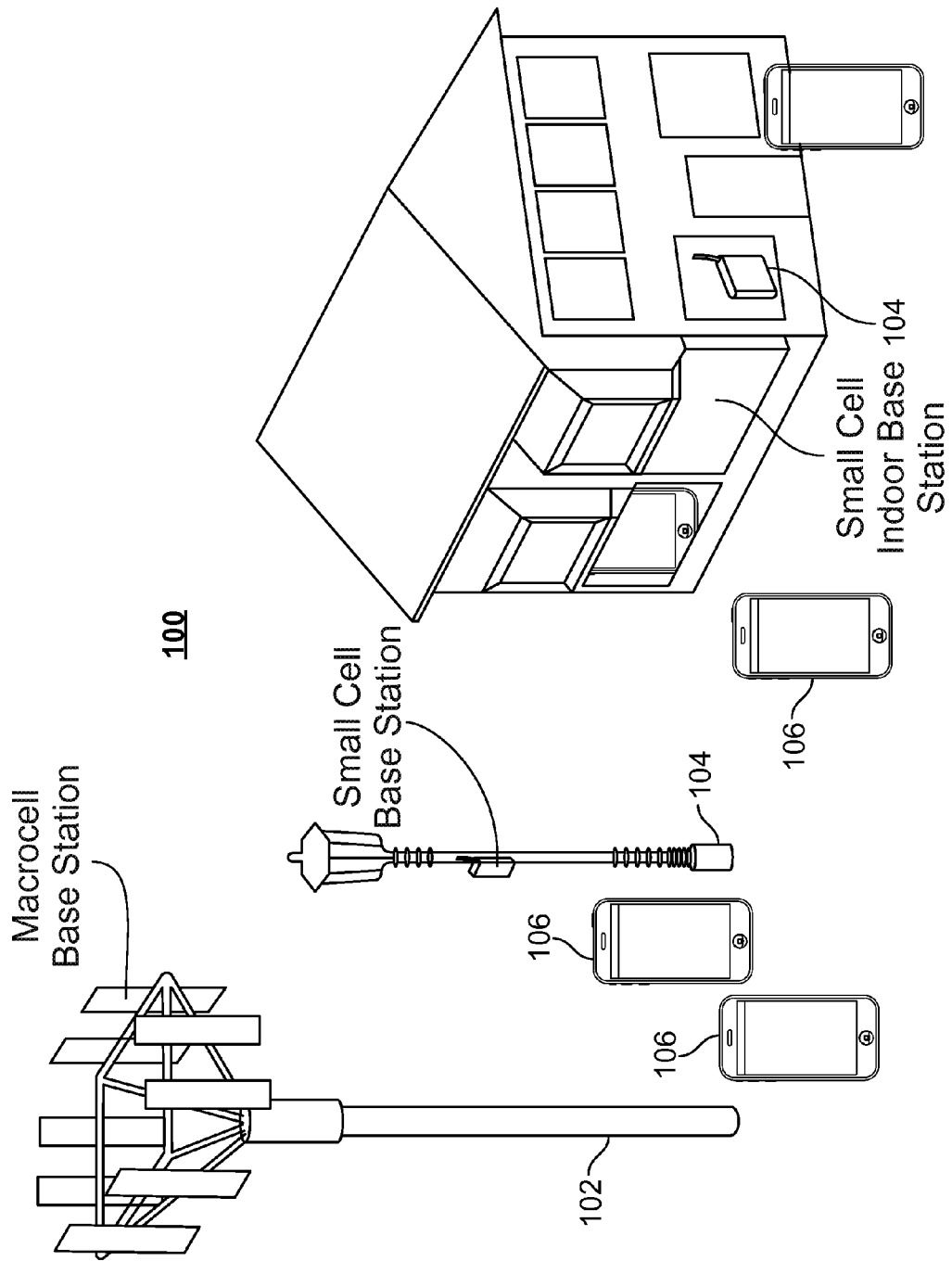
FIG. 1 illustrates an embodiment of a hierarchical cellular network architecture 100.

FIG. 1 illustrates an embodiment of a hierarchical cellular network architecture 100. In contrast to a flat cellular network, a hierarchical cellular network includes macrocell(s) 102 and various levels of small cells 104 (e.g., femtocells, picocells, and microcells) with lower power cellular base stations. Small cell base stations transmit at much lower powers and hence have smaller coverage areas. This enables more efficient spatial reuse of spectrum, leading to higher aggregate throughput than in macrocell-only networks. Small cells 104 also bring their base stations closer to the mobile user equipment (UE) 106, resulting in better coverage and less power consumption at both the base stations and the devices. In addition, small cells 104 do not cause significant interference to macrocell users for a number of reasons. A UE 106 associates with a macrocell base station only if the received signal strength from the macrocell base station on the downlink is at least as high as the received signal strength from a small cell base station. On the uplink, the channel gain from a UE 106 to a small cell 104 is typically large. Hence, the UEs 106 can achieve their desired performance with a lower transmit power to the small cell base station, resulting in minimal interference to macrocell 102. Moreover, offloading users to small cells 104 leads to higher throughput for all users, including those associated with macrocell 102, since more resources are made available at macrocell 102 and the resources may be used more efficiently. These small cell benefits coupled with low cost have brought about a paradigm shift in 4G cellular architectures from flat to hierarchical, with macrocells deployed for coverage and small cells deployed for capacity, coverage, and power efficiency.

At the same time, the deployment challenges of small cells have precluded their widespread adoption to date. Typically, the deployment of macrocells in the field is both time-consuming and costly. For example, the network operator or service provider typically deploys a macrocell by sending a team of engineers to the field to configure, make measurements, debug, and fine-tune the configuration parameters of the base stations and the associated networks. Since the number of small cells that are needed to be deployed in a given area is much larger than the number of macrocells in the area, deploying the small cells by sending a team of engineers in the field to configure and fine-tune the parameters of the base stations would be both time and cost-prohibitive. In addition, femtocell base stations are often placed in arbitrary locations by the end-users, rendering the manual configuration by engineers impractical. Moreover, configuring the small cells in such a manner is likely non-optimal, in part because the configuration is determined by trial and error and based on limited information. The alternative—deploying the small cells using pre-configured parameters—also has a number of drawbacks: for example, the interference caused by the small cells to the macrocells may be so high in some situations that it severely impacts the overall performance and service of the entire cellular network; resources that are used by the macrocells and the small cells may not be shared optimally and efficiently; additionally, handovers between the macrocells and the small cells may not be performed reliably.

Figure 2:
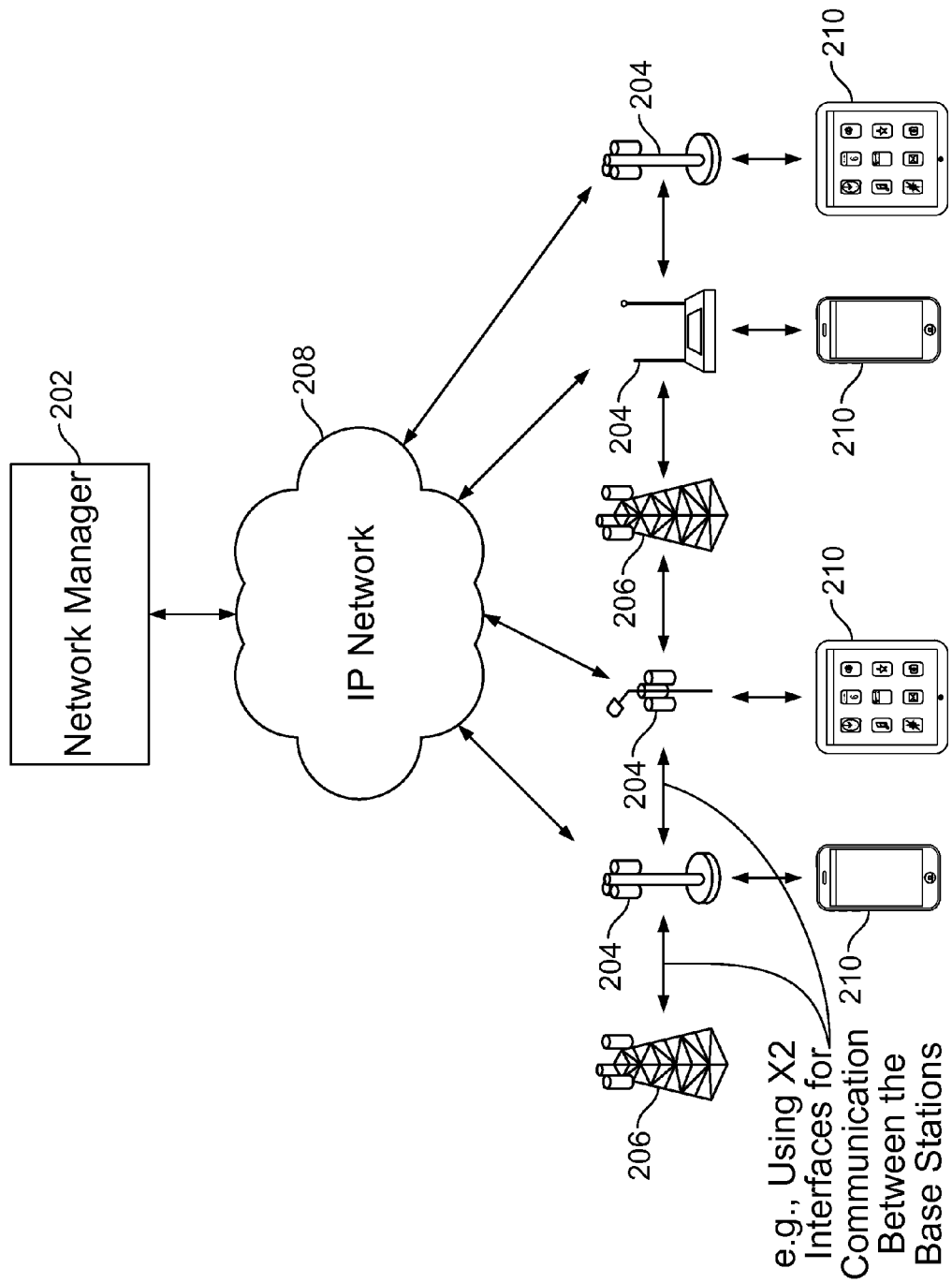
FIG. 2 illustrates an embodiment of a cellular network manager 202 for automatically and dynamically configuring and updating parameters of the small cell base stations 204 in a cellular network to optimize the overall network performance of the cellular network.

FIG. 2 illustrates an embodiment of a cellular network manager 202 for automatically and dynamically configuring and updating parameters of the small cell base stations 204 in a cellular network to optimize the overall network performance of the cellular network. As will be described in greater detail below, cellular network manager 202 may be used for intelligent and dynamic self-configuration, self-optimization, and self-healing of the small cells in order to optimize the overall network performance of the cellular network.

As shown in FIG. 2, the cellular network is a heterogeneous network (HetNet) including macrocell base stations 206 and various levels of small cell base stations 204 (e.g., femtocell, picocell, and microcell base stations) with various levels of transmit power. The cellular network may be any IP-based cellular networks, including cellular networks based on the 4G LTE standard and cellular networks based on any future-generation cellular standards. The cellular network provides wireless service to a plurality of UEs 210. UEs 210 may be cellular phones, laptop computers equipped with mobile broadband adapters, tablets, and the like.

In some embodiments, cellular network manager 202 connects to small cell base stations 204 via an IP network 208 and provides service to small cell base stations 204 as a network server. In some embodiments, a software agent is installed on each small cell base station 204, and the software agent is used to communicate with and obtain services from cellular network manager 202.

Cellular network manager 202 allows network operators to optimize the tradeoff between the performance benefits of the small cells versus their impact on the macrocells (e.g., the amount of interference caused by the small cells on the macrocells). In some embodiments, cellular network manager 202 automatically and dynamically configures the parameters of small cell base stations 204 to optimize the HetNet's overall network performance, subject to any predefined constraints dictated by the network operators.

The predefined constraints may include any constraints on performance-related metrics, including but not limited to constraints on interference caused to the macrocells by the small cells, throughput, delay, number of dropped calls, coverage, the ability to offload traffic to Wi-Fi networks, and the like. For example, the network operator of the cellular network may specify a maximum threshold (e.g., 6 dBm) for the amount of interference that the small cells may cause to the macrocells. In one example, the network operator may specify a minimum aggregate throughput or a maximum percentage drop in throughput in a particular macrocell. In another example, the network operator of the cellular network may specify a minimum percentage of end-users having a minimum threshold of data throughput. In another example, the network operator of the cellular network may specify a maximum number or percentage of dropped calls within a predefined period of time. In yet another example, the network operator may specify a minimum percentage of end-users having coverage. Note that the above examples are provided for illustrative purposes only. Therefore, the present application is not limited to these specific examples only.

With continued reference to FIG. 2, measurements are periodically collected by small cell base stations 204 from different UEs 210 and/or from other base stations (e.g., macrocell base stations), and these measurements are then sent by small cell base stations 204 to cellular network manager 202. Measurements may include, but are not limited to, signal strength, interference indicators, channel quality, throughput, packet error rate, and load information. Cellular network manager 202 then computes the configuration parameters for at least some of the small cell base stations 204 that optimize network performance tradeoffs, such as minimum interference, maximum throughput, and maximum coverage, based on the measurement data and the predefined constraints specified by the network operator. For example, the configuration parameters may be determined using different searching or optimization techniques. Configuration parameters for small cell base stations 204 include frequency parameters, channel allocation parameters, fractional frequency reuse parameters, power parameters, interference coordination parameters, antenna parameters, time-division parameters, cell range extension (CRE) parameters, and the like. The computed configuration parameters for small cell base stations 204 are then transmitted from cellular network manager 202 to small cell base stations 204 for self-configuration, self-optimization, or self-healing of the small cells.

In some embodiments, the measurements and the interfaces for connecting the base stations to cellular network manager 202 are standards-based measurements and interfaces. For example, small cell base stations 204 may be connected to cellular network manager 202 via $3^{rd}$ Generation Partnership Project (3GPP) compliant interfaces. The 3GPP standard specifies a set of measurements that are periodically collected by the base stations from the UEs and other base stations via the standardized X2 interfaces. The X2 interfaces connect neighboring base stations in a peer-to-peer fashion to assist handover and provide a means for rapid coordination of radio resources. In some other embodiments, the measurements or the interfaces for connecting the base stations to cellular network manager 202 are non-standards based measurements and interfaces.

As described above, measurements are periodically collected by small cell base stations 204 from different UEs 210 and/or from other base stations (e.g., macrocell base stations). For example, a small cell base station 204 may receive measurement data from a UE 210 that is connected to the small cell base station 204, and the measurement or performance data is information corresponding to the UE 210 itself or information corresponding to any neighboring base stations that the UE 210 can hear from. A small cell base station 204 may also receive measurements or performance information directly (e.g., via X2 interfaces) from its neighboring base stations, including its neighboring small cell base stations 204 and neighboring macrocell base stations 206. One illustrative example of measurement data that can be collected directly by a small cell base station 204 from a neighboring base station is the Uplink Interference Overload Indication (OI) message exchanged over the X2 interface. Via an OI message, a neighboring base station may inform a small cell base station 204 of the average uplink interference plus noise that the neighboring base station experiences in individual physical resource blocks (PRBs). The average uplink interference plus noise is indicated as one of three levels—low, medium, or high levels of interference plus noise. A small cell base station 204 may also obtain measurements or performance information from neighboring base stations by periodically entering a network listen/monitor mode. In the network listen mode, the small cell base station may decode broadcast information from neighboring base stations to determine properties of transmissions in its RF vicinity. The set of broadcast messages that the small cell base station can decode depends on how much of the UE functionality is implemented at the small cell base station. In some embodiments, the amount of measurement data that are collected by small cell base stations 204 may vary depending on the level of cooperation between small cell base stations 204 and their neighboring base stations. For example, if a particular macrocell base station 206 is cooperative with a particular small cell base station 204, then additional or non-standards based measurements may be sent by the macrocell base station 206 to the small cell base station 204. In some cases, these additional measurement data may be used by the optimization techniques performed by cellular network manager 202 to further optimize the overall network performance.

Figure 3:
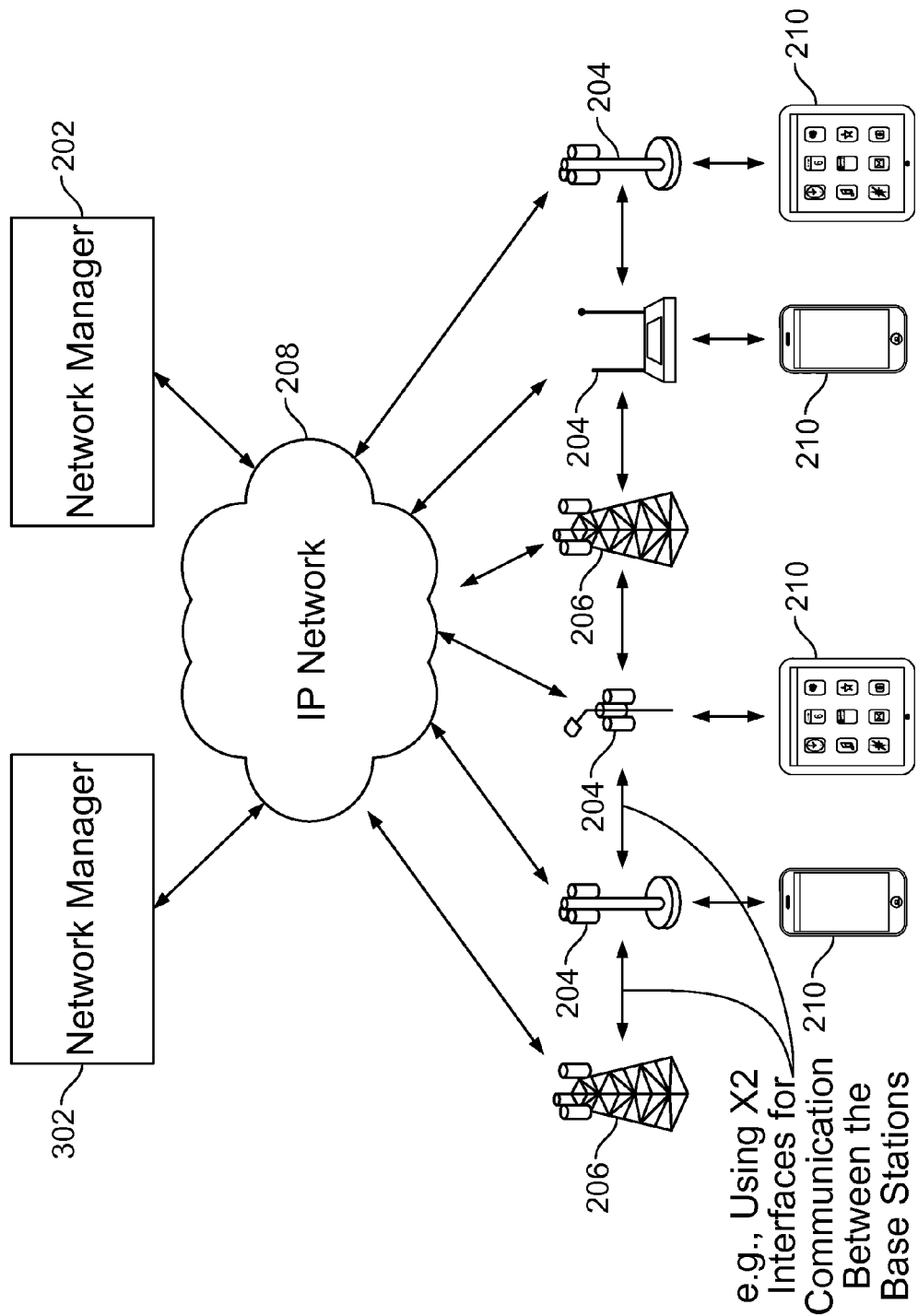
FIG. 3 illustrates an embodiment of a cellular network manager 202 for automatically and dynamically configuring and updating parameters of the small cell base stations 204 in a cellular network to optimize the overall network performance of the cellular network.

FIG. 3 illustrates an embodiment of a cellular network manager 202 for automatically and dynamically configuring and updating parameters of the small cell base stations 204 in a cellular network to optimize the overall network performance of the cellular network. In this embodiment, cellular network manager 202 manages and dynamically configures a plurality of small cell base stations 204 using the various techniques discussed above. In addition, a second cellular network manger 302 manages and dynamically configures a plurality of macrocell base stations 206. Cellular network manager 202 and cellular network manager 302 may exchange information or measurement data. For example, cellular network manager 302 may transmit the interference information of a macrocell base station 206 to cellular network manager 202. In some embodiments, cellular network manager 202 and cellular network manager 302 are integrated into a single module for automatically and dynamically configuring and updating parameters of both small cell base stations 204 as well as macrocell base stations 206, thereby optimizing the network performance associated with both the small cells and the macrocells.

As described above, different optimization techniques may be used for searching the configuration parameters for small cell base stations 204. A plurality of configuration parameters may be optimized at the same time. In addition, any combination of configuration parameters may be optimized at the same time. For example, power parameters, fractional frequency reuse parameters, cell range extension parameters of one or more small cell base stations 204 may be optimized at the same time. In some cases, an optimal solution set subject to a specific set of predefined constraints may not be achievable, and relaxation techniques may be applied. In some embodiments, in addition to a predefined constraint (e.g., maximum permissible interference) for the optimization, statistics associated with the predefined constraint may be provided by the network operator. For example, the network operator may specify that the probability of interference exceeding the predefined constraint be less than 1%, thus allowing the optimization techniques to compute a solution set while meeting the predefined constraint as close as possible.

Cellular network manager 202 allows the network operator to deploy small cells while keeping their impact to the macrocells to levels acceptable to the operator. Limits of degradation in the macrocells may be specified, and then small cell base stations 204 may be deployed to meet those limits. Small cell base stations 204 may be deployed in multiple stages. For example, after a small cell base station 204 is deployed, the network operator may relax the predefined constraints (e.g., increase the interference constraint experienced by a macrocell) in an iterative approach to achieve increasingly higher aggregate network performance.

FIG. 4 is a flow chart illustrating an embodiment of a process 400 for automatically and dynamically configuring and updating parameters of the small cell base stations 204 in a cellular network to optimize the overall network performance of the cellular network. In some embodiments, process 400 is a process that runs on cellular network manager 202.

At 402, a constraint on a performance-related metric associated with one or more macrocells is received. Performance-related metrics include interference in the macrocells attributed to the small cells, throughput, delay, volume or probability of dropped calls, coverage, and the like. In some embodiments, the constraint is configurable by the network operator via a graphical user interface (GUI) or by configuration files. For example, the network operator may configure a maximum threshold for the amount of interference that the small cells may cause to the macrocells for interference management.

At 404, measurement data is received from one or more small cell base stations. In some embodiments, the measurement data may be collected by a small cell base station from the UEs connected to the small cell base station, and the measurement data may include information regarding a particular UE or regarding neighboring cells/base stations that the UE can detect on the cellular network. In some embodiments, the measurement data may be collected by a small cell base station from other neighboring base stations, including neighboring small cell base stations or neighboring macrocell base stations. For example, these measurement data may be sent from a neighboring base station to the small cell base station via standard-based interfaces, such as the X2 interfaces. The measurement data may include signal strength, interference indicators, channel quality, throughput, packet error rate, load information, and the like. The measurement data may be standards-based measurements or non-standards based measurements.

At 406, the optimized values of parameters associated with one or more small cell base stations that optimize the cellular network performance are searched. As the cellular network manager receives measurement data about different portions of the entire cellular network, the measurement data may be used by the cellular network manager to compute the parameters of the small cell base stations that can optimize network performance in a global sense, thereby achieving superior network performance. The search is based on the measurement data received from the small cell base stations and subject to the received constraint(s) on the performance-related metric.

The cellular network performance may be defined by different metrics. In some embodiments, the metrics may be a set of network performance optimization goals defined by a network operator. The goals may include increasing the average network throughput, increasing the geometric mean throughput, reducing interference, reducing outage probability, increasing coverage, improving fairness, supporting specific quality-of-service metrics for high-priority traffic, and the like. The network performance optimization goals may be performance goals corresponding to the small cell networks only, the macrocell networks only, or both the small cell networks and the macrocell networks. In some embodiments, the network operator may weigh the network performance optimization goals of different portions of the entire cellular network (i.e., the cellular network including both small cells and marcocells) differently. For example, the network operator may optimize a weighted combination of the small cell network performance optimization goals and the macrocell network performance optimization goals Different parameters may be dynamically adjusted to optimize the overall cellular network performance. The parameters may include frequency channel parameters, fractional frequency reuse parameters, transmit power parameters, interference coordination parameters, antenna parameters, time-division parameters, cell range extension parameters, handoff information, and the like. The frequency parameters may be optimized such that different bands of frequency (as opposed to only the higher frequency bands) may be allocated to a small cell base station. For example, instead of allocating high frequency bands to small cells and low frequency bands to macrocells, cellular network manager 202 may divide the spectrum into finer granularity, and allocate the frequency channels to the small cell base stations and the macrocell base stations for optimized performance.

In some embodiments, the parameters that may be dynamically optimized include parameters corresponding to an orthogonal frequency division multiplexing (OFDM) based system (e.g., an LTE system). As will be described in greater detail below, different resources may be allocated for different physical channels (data or control channels) for uplink and downlink. The transmission powers on the different channels in time and frequency may be dynamically optimized. Furthermore, the physical cell ID of a cell may be dynamically optimized.

The basic unit of resource in an OFDM system is a subcarrier in the frequency domain and a symbol in the time domain.

The physical channels for Downlink (DL) include:
a. Physical Broadcast Channel (PBCH)
b. Physical Control Format Indicator Channel (PCFICH)
c. Physical Downlink Control Channel (PDCCH)
d. Physical Downlink Shared Channel (PDSCH)
e. Physical Hybrid ARQ Indicator Channel (PHICH)

The control channels (PDCCH, PHICH, PCFICH) are time multiplexed with PDSCH. On the DL, the resource allocation includes determining the following:
(i) What fraction of symbols are allocated for PDCCH
(ii) the transmission power used for PDCCH
(iii) the transmission power profile across frequency for PDSCH
(iv) the scheduling of almost blank subframes when only a small number of reference signals are transmitted on the data resources to mitigate interference at neighboring cells The physical channels for the uplink include:
a. Physical Uplink Control Channel (PUCCH)
b. Physical Uplink Shared Channel (PUSCH)
c. Physical Random Access Channel (PRACH)
d. Sounding Reference Signal (SRS).

PUCCH and PUSCH are multiplexed in the frequency domain, whereas PUSCH and SRS are multiplexed in the time domain. Resource allocation includes determining the following:
(i) What fraction of bandwidth is allocated to PUCCH
(ii) PUCCH transmission power control parameters for UEs
(iii) How often SRS is transmitted and over how many RBs.
(iv) PUCCH transmission power control parameters for UEs: this can be a periodic function of time
(v) PUSCH high and low interference subcarriers in frequency In some embodiments, the parameters that may be dynamically optimized include physical cell IDs. A physical cell ID ranges from 0 to 503 and determines the scrambling for primary and secondary synchronization signals, as well as the transmission characteristics of the cell reference signal (CRS). Hence, if a base-station knows the physical cell id of neighboring cells, it can make an optimized choice of its own cell id.

Different optimization techniques may be employed by a cellular network manager for searching the optimized parameters. In some embodiments, the network performance optimization goals are evaluated based at least in part on the measurement data received from the small cell base stations. The set of network performance optimization goals may be represented by an objective function or a cost function in an optimization problem. An optimized parameter resulting from the search is a feasible solution or optimal solution that minimizes (or maximizes) the objective function subject to different constraints. Since multiple types of parameters may be adjusted simultaneously during a search, different techniques to combat interference, increase throughput, or maximize coverage may be leveraged at the same time. For example, instead of determining transmit power and frequency reuse individually or locally, they can be optimized simultaneously in a global sense.

With continued reference to FIG. 4, at 408, the optimized values of the parameters associated with the small cell base stations are transmitted to the small cell base stations. The parameters may be used by the small cell base stations for self-configuration, self-optimization, and self-healing, such that the base stations can collectively form a self-organizing network.

The parameters may be used to initialize a small cell base station that has been recently installed. For example, after a small cell base station is first installed, the small cell base station collects initial measurement data and sends the data to the cellular network manager. The cellular network manager then computes the parameters for a small cell base station and sends them to the small cell base station for self-configuration.

The parameters may be used to re-configure an existing small cell base station. When the existing small cell base station connects to the cellular network manager for the first time, the existing small cell base station is treated as a new installation for the purpose of network optimization. The cellular network manager computes new parameters for the existing small cell base station based on the received measurement data from the existing small cell base station and other base stations, and it sends the new parameters to the existing small cell base station for reconfiguration.

The parameters may be used to periodically update the parameters of an existing small cell base station. The parameters are computed based on dynamic, real-time measurements made or collected periodically by the small cell base station.

The parameters may also be used by the small cell base stations for self-healing any network topology changes. For example, a network topology change may be caused by the failure of a base station. The cellular network manager detects the failure, and the parameters of the surrounding small cell base stations are automatically adjusted to fill in the resulting coverage hole. In another example, a network topology change may be caused by new base stations being installed on the cellular network. The network topology change may be detected by the cellular network manager, which is triggered by the detection to initiate a new search.

As described above, standard-based measurement data may be collected directly by a small cell base station 204 from a neighboring base station via standards-based interfaces. One illustrative example is the inter-cell interference coordination (ICIC) mechanisms that have been incorporated into the 3GPP LTE standard for managing interference and optimizing offloading of data traffic to small cells. Messages are exchanged between base stations over the X2 interface; these messages include, but are not limited to, the Relative Narrowband Transmit Power (RNTP) messages, the Uplink Interference Overload Indication (OI), and the Uplink High Interference Indication (HII).

In one illustrative example, cellular network manager 202 minimizes a small cell's downlink and uplink interferences to a macrocell as follows:

After receiving an RNTP message from a macrocell, a small cell base station may reduce its downlink interference to the macrocell's UEs by either not using or lowering its downlink transmit power in the PRBs in which the macrocell base station uses high transmit power. This increases the signal to interference plus noise ratio (SINR) of the cell-edge users of the macrocell when their traffic is scheduled on these PRBs. For the macrocell users that are not on the cell edge, the small cell causes lower interference on all PRBs since the small cell's transmit power is much lower (by approximately 16 dB) than that of the macrocell.

On the uplink, if the small cell receives an HII message or an OI message, the small cell base station may limit the interference it causes to the macrocells by lowering the transmit power of its UEs on any PRB for which either the HII or the OI message from the macrocell has a high value. The transmit power can be chosen based on measurement reports obtained from the UE (which can be used to estimate path loss to the macrocell) and the power control mechanism.

In another illustrative example, cellular network manager 202 optimizes the network performance as follows:

When a small cell base station receives measurement reports from a UE that is associated with the small cell base station and is lying on the cell edge of a macrocell, the measurement reports give an estimate of the macrocell received power on the cell edge. The RNTP message allows the small cell base station to estimate a lower bound on the transmit power of the macrocell for cell edge users. The small cell base station may lower its power in PRBs in which the macrocell has a higher RNTP, thereby providing a means for cell edge users to achieve a certain minimum SINR.

The small cell base station can enable better load balancing by suggesting cell range extension (CRE) bias values to the macrocell based on messages received by it from the macrocell.

As described above, cell range extension parameters are examples of configurable parameters that can be optimized by cellular network manager 202.

Figure 5B:
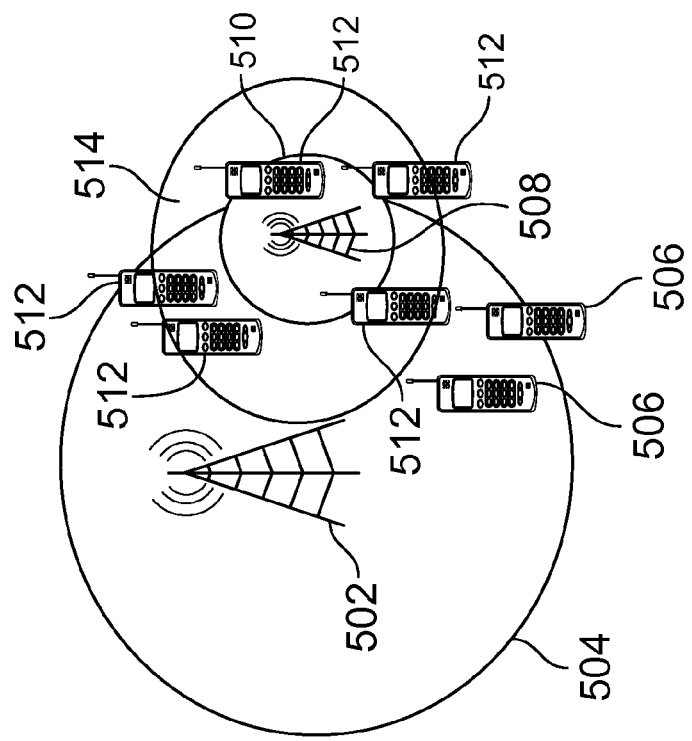
FIG. 5*b* illustrates that cell range extension techniques may be used to offload traffic from a macrocell to a small cell, thereby allowing more efficient spatial reuse of the cellular spectrum.
Figure 5A:
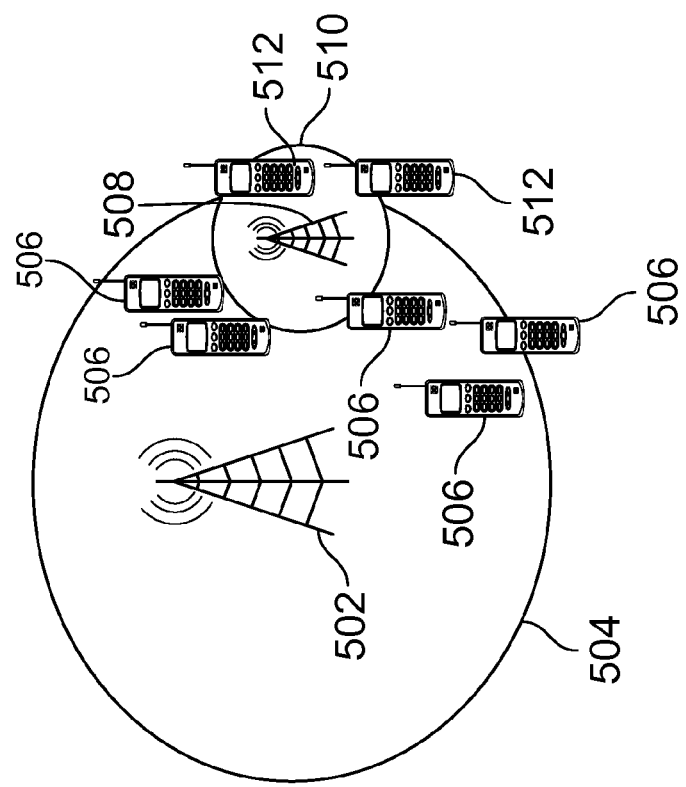
FIG. 5*a* illustrates that without cell range extension, a small cell base station serves few users, while the macrocell is overloaded.

FIG. 5a illustrates that without cell range extension, a small cell base station serves few users, while the macrocell is overloaded. As shown in FIG. 5a, the number of UEs 512 connected to a small cell base station 508 is typically much smaller than the number of UEs 506 connected to a macrocell base station 502, because the transmit power of macrocell base station 502 is much larger than that of the small cell base station 508.

FIG. 5b illustrates that cell range extension techniques may be used to offload traffic from a macrocell to a small cell, thereby allowing more efficient spatial reuse of the cellular spectrum. Cell range extension is implemented by configuring a UE to trigger measurement reporting whenever its measured signal quality from a neighboring cell base station (typically a small cell base station) is within a CRE bias threshold with respect to the serving cell base station's reference signal received power (RSRP). For example, the bias threshold may be set to a few dBm below the RSRP of the serving cell base station, so as to bias the UE to be handed off to the neighboring small cell. If the bias threshold is set to zero, then there is no preferential offloading of UEs from the macrocell to the small cell. Higher bias threshold values result in more offloading to small cells. Cellular network manager 202 may optimize the overall network performance by dynamically and automatically adjusting the CRE parameters (together with other parameters) to balance the load of different portions of the cellular network.

In some embodiments, a Wi-Fi access point (AP) is integrated or co-located with a small cell base station. Offloading data from the cellular network to Wi-Fi networks is an attractive mechanism to mitigate the spectrum scarcity faced by cellular networks for a number of reasons. For example, the spectrum allocated for Wi-Fi networks is significantly greater than that allocated for cellular networks. Moreover, the spectrum allocated to Wi-Fi networks is unlicensed, thus incurring no additional spectrum licensing costs to the Wi-Fi providers. Cellular network manager 202 may further optimize the overall network performance by dynamically and automatically adjusting the CRE parameters within the cellular network, such that the UEs are biased to be preferentially handed off to a neighboring small cell base station integrated with a Wi-Fi AP than to a neighboring small cell base station that is not integrated or co-located with a Wi-Fi AP.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of configuring small cell base stations in a cellular network, comprising:
   receiving a constraint on a performance-related metric associated with at least a portion of the cellular network;
   receiving measurement data from one or more small cell base stations via a control interface;
   searching, using a processor, for one or more optimized values of one or more parameters associated with one or more small cell base stations, wherein the searching is based at least in part on the received measurement data and subject to the constraint on the performance-related metric associated with the at least a portion of the cellular network, wherein the one or more parameters comprise a parameter corresponding to a cell range extension bias towards a small cell base station, and wherein the searching optimizes the parameter corresponding to the cell range extension bias based on whether the small cell base station is integrated with or co-located with a Wi-Fi access point; and transmitting the one or more optimized values of the one or more parameters to the associated small cell base stations.

2. The method of claim 1, where the constraint on the performance-related metric comprises a constraint on a performance-related metric associated with one or more macrocells.

3. The method of claim 1, wherein the searching is based on a set of network performance optimization goals.

4. The method of claim 3, wherein the network optimization goal comprises one of the following: increasing the average network throughput, increasing the geometric mean throughput, reducing interference, reducing outage probability, increasing coverage, improving fairness, and supporting specific quality-of-service metrics for high-priority traffic.

5. The method of claim 3, wherein the set of network performance optimization goals comprises one of the following: network performance optimization goals corresponding to small cells, network performance optimization goals corresponding to macrocells, and a weighted combination of network performance optimization goals corresponding to small cells and macrocells.

6. The method of claim 1, wherein the performance-related metric comprises one of the following: interference, throughput, delay, number of dropped calls, and coverage.

7. The method of claim 1, wherein the measurement data comprises measurement data collected by a small cell base station from a user equipment (UE) connected to the small cell base station.

8. The method of claim 7, wherein the measurement data collected by the small cell base station comprises information corresponding to the UE.

9. The method of claim 7, wherein the measurement data collected by the small cell base station comprises information corresponding to a neighboring base station that the UE can hear from.

10. The method of claim 1, wherein the measurement data comprises measurement data collected by a small cell base station from a neighboring base station.

11. The method of claim 1, wherein the measurement data comprises one of the following: signal strength, interference, channel quality, throughput, packet error rate, and load information.

12. The method of claim 1, wherein the one or more parameters comprise a parameter corresponding to one of the following: frequency channel, fractional frequency reuse, power, interference coordination, antenna, time-division, cell range extension, and handoff.

13. The method of claim 1, wherein two or more parameters are jointly optimized.

14. The method of claim 1, further comprising:
detecting whether a base station has failed or whether a new base station has been installed; and
initiating the search in response to the detection.

15. The method of claim 1, wherein the searching is performed periodically and wherein the measurement data is received periodically.

16. The method of claim 1, further comprising:
receiving additional measurement data from another manager managing a macrocell base station; and
wherein the searching of the one or more optimized values of the one or more parameters is further based on the additional measurement data.

17. A cellular network manager for configuring small cell base stations in a cellular network, comprising:
a control interface in communication with a plurality of small cell base stations;
a processor; and
a memory storing a set of network performance optimization goals, wherein the memory is coupled with the processor, and wherein the memory is configured to provide the processor with instructions which when executed cause the processor to:
receive a constraint on a performance-related metric associated with at least a portion of the cellular network;
receive measurement data from one or more small cell base stations;
search for one or more optimized values of one or more parameters associated with one or more small cell base stations, wherein the searching is based at least in part on the received measurement data and subject to the constraint on the performance-related metric associated with the at least a portion of the cellular network, wherein the one or more parameters comprise a parameter corresponding to a cell range extension bias towards a small cell base station, and wherein the searching optimizes the parameter corresponding to the cell range extension bias based on whether the small cell base station is integrated with or co-located with a Wi-Fi access point; and
transmit the one or more optimized values of the one or more parameters to the associated small cell base stations.

18. The system of claim 17, where the constraint on the performance-related metric comprises a constraint on a performance-related metric associated with one or more macrocells.

19. The system of claim 17, wherein the searching is based on a set of network performance optimization goals.

20. The system of claim 19, wherein the network optimization goal comprises one of the following: increasing the average network throughput, increasing the geometric mean throughput, reducing interference, reducing outage probability, increasing coverage, improving fairness, and supporting specific quality-of-service metrics for high-priority traffic.

21. The system of claim 19, wherein the set of network performance optimization goals comprises one of the following: network performance optimization goals corresponding to small cells, network performance optimization goals corresponding to macrocells, and a weighted combination of network performance optimization goals corresponding to small cells and macrocells.

22. The system of claim 17, wherein the performance-related metric comprises one of the following: interference, throughput, delay, number of dropped calls, and coverage.

23. The system of claim 17, wherein the measurement data comprises measurement data collected by a small cell base station from a user equipment (UE) connected to the small cell base station.

24. The system of claim 23, wherein the measurement data collected by the small cell base station comprises information corresponding to the UE.

25. The system of claim 23, wherein the measurement data collected by the small cell base station comprises information corresponding to a neighboring base station that the UE can hear from.

26. The system of claim 17, wherein the measurement data comprises measurement data collected by a small cell base station from a neighboring base station.

27. The system of claim 17, wherein the measurement data comprises one of the following: signal strength, interference, channel quality, throughput, packet error rate, and load information.

28. The system of claim 17, wherein the one or more parameters comprise a parameter corresponding to one of the following: frequency channel, fractional frequency reuse, power, interference coordination, antenna, time-division, cell range extension, and handoff.

29. The system of claim 17, wherein two or more parameters are jointly optimized.

30. The system of claim 17, wherein the memory is further configured to provide the processor with instructions which when executed cause the processor to:
    detect whether a base station has failed or whether a new base station has been installed; and
    initiate the search in response to the detection.

31. The system of claim 17, wherein the searching is performed periodically and wherein the measurement data is received periodically.

32. The system of claim 17, wherein the memory is further configured to provide the processor with instructions which when executed cause the processor to:
    receive additional measurement data from another manager managing a macrocell base station; and
    wherein the searching of the one or more optimized values of the one or more parameters is further based on the additional measurement data.

33. A computer program product for configuring small cell base stations in a cellular network, the computer program product being embodied in a non-transitory computer readable storage medium and comprising computer instructions for:
    receiving a constraint on a performance-related metric associated with at least a portion of the cellular network;
    receiving measurement data from one or more small cell base stations via a control interface;
    searching, using a processor, for one or more optimized values of one or more parameters associated with one or more small cell base stations, wherein the searching is based at least in part on the received measurement data and subject to the constraint on the performance-related metric associated with the at least a portion of the cellular network, wherein the one or more parameters comprise a parameter corresponding to a cell range extension bias towards a small cell base station, and wherein the searching optimizes the parameter corresponding to the cell range extension bias based on whether the small cell base station is integrated with or co-located with a Wi-Fi access point; and
    transmitting the one or more optimized values of the one or more parameters to the associated small cell base stations.

34. The computer program product of claim 33, where the constraint on the performance-related metric comprises a constraint on a performance-related metric associated with one or more macrocells.

* * * * *